United States Patent
Thierry et al.

(10) Patent No.: US 10,975,199 B2
(45) Date of Patent: Apr. 13, 2021

(54) PRODUCTION OF AN AQUEOUS SOLUTION OF DIAMINE/DIACID SALTS

(71) Applicant: PolyTechnyl, SAS, Paris (FR)

(72) Inventors: Jean-François Thierry, Francheville (FR); Thomas Ternisien, Lyons (FR)

(73) Assignee: PolyTechnyl SAS, Paris (FR)

( * ) Notice: Subject to any disclaimer, the term of this patent is extended or adjusted under 35 U.S.C. 154(b) by 0 days.

(21) Appl. No.: 16/335,898

(22) PCT Filed: Sep. 15, 2017

(86) PCT No.: PCT/EP2017/073329
§ 371 (c)(1),
(2) Date: Mar. 22, 2019

(87) PCT Pub. No.: WO2018/054784
PCT Pub. Date: Mar. 29, 2018

(65) Prior Publication Data
US 2020/0017637 A1    Jan. 16, 2020

(30) Foreign Application Priority Data

Sep. 22, 2016 (EP) .................... 16190023

(51) Int. Cl.
*C08G 69/28* (2006.01)
(52) U.S. Cl.
CPC .................... *C08G 69/28* (2013.01)
(58) Field of Classification Search
CPC .................................................. C08G 69/28
See application file for complete search history.

(56) References Cited

U.S. PATENT DOCUMENTS

| 5,213,668 A | 5/1993 | Zboril |
| 6,696,544 B1 | 2/2004 | Thierry et al. |
| 8,772,439 B2 * | 7/2014 | Thierry .................. C08G 69/28 528/335 |
| 2010/0168375 A1 | 7/2010 | Thierry |
| 2014/0249330 A1 | 9/2014 | Siebecke et al. |
| 2016/0075827 A1 * | 3/2016 | Welch .................... C07C 55/14 528/335 |

FOREIGN PATENT DOCUMENTS

| EP | 2546227 A1 | 1/2013 |
| WO | 0130748 A1 | 5/2001 |
| WO | 2014179067 A1 | 11/2014 |
| WO | 2015094394 A1 | 6/2015 |

OTHER PUBLICATIONS

Blanco et al "(Density, Speed of Sound, Viscosity, and Surface Tension of Dimethylethylenediamine+Water and (Ethanolamine+Dimethylethanolamine)+Water from T=(293.15 to 323.15) K", J. Chem. Eng. Data 2016, 61, 188-194, Published on Nov. 13, 2015.*
International Search Report issued in International Application No. PCT/EP2017/073329, dated Oct. 12, 2017 (3 pages).
Written Opinion issued in International Application No. PCT/EP2017/073329; dated Oct. 12, 2017 (5 pages).

* cited by examiner

*Primary Examiner* — Gregory Listvoyb
(74) *Attorney, Agent, or Firm* — Osha Bergman Watanabe & Burton LLP

(57) ABSTRACT

The present invention relates to a process for the production of an aqueous solution of a salt of a diamine and a diacid for the manufacture of polyamide.

15 Claims, 5 Drawing Sheets

PRODUCTION OF AN AQUEOUS SOLUTION OF DIAMINE/DIACID SALTS

This application is a U.S. national phase entry under 35 U.S.C. § 371 of International Application No. PCT/EP2017/073329, filed Sep. 15, 2017, the entire content of which is hereby incorporated herein by reference.

The present invention relates to a process for the production of an aqueous solution of a salt of a diamine and a diacid for the manufacture of polyamide.

More particularly, the invention relates to a process for the manufacture of a concentrated solution of hexamethylenediammonium adipate salt, also called nylon salt or N-salt, used as starting material for the manufacture of polyamide, more specifically of PA66.

In order to obtain polyamides comprising diacid and diamine monomers of high molecular weight, an aqueous solution of a salt formed by reaction between a diamine molecule and a diacid molecule is generally used. One of the main specifications of the aqueous solution is the molar balance between diamine and diacid molecules. Accuracy needed on molar ratio control has to be in the order of 1E-4, in order to give access to polymer with high molecular weight and end group concentrations meeting specification for special applications such as textile yarn.

This solution is then heated in order to initially evaporate off the water and then in order to initiate the polymerization via a condensation mechanism, so as to obtain macromolecular chains comprising amide functions.

The salt solution generally contains stoichiometric amounts of diacids and diamines. The concentration by weight of nylon salt is generally between 50% and 70%. This solution is generally stored and optionally transported where appropriate, before use into polymerization installations.

The maximum admissible concentration of nylon salt in order to avoid problems of precipitation or crystallization is in the order of 70% by weight at atmospheric pressure. Above this concentration, it is necessary to heat the solution at temperatures between 110° C. and 170° C., at a pressure higher than atmospheric pressure, in order to prevent any precipitation or crystallization. These temperature and pressure ranges are not easily compatible with storage and transport.

Several processes for manufacturing a nylon salt solution have been proposed. These processes generally consist in adding adipic acid to hexamethylenediamine and water, while evacuating the heat produced by the neutralization reaction.

US 2010/0168375 A1 describes a process for the manufacture of an aqueous solution of salts of diamines and dicarboxylic acids, obtained by mixing a diacid and diamine, by first producing, in a first reactor, an unbalanced aqueous solution of diamine and diacid with a diacid/diamine molar ratio ranging from 1.5 to 5 and a concentration of the dissolved species in water ranging from 40% to 75% by weight, transferring the thus obtained aqueous solution into a second reactor, and feeding into the second reactor a stream comprising diamine so as to obtain a diacid/diamine molar ratio ranging from 0.9 to 1.1. In the first step, the diacid can be added in powder form or in the form of an aqueous suspension. In the final step of adjusting the diacid/diamine molar ratio, this molar ratio is controlled via pH measurement of the solution.

U.S. Pat. No. 6,696,544 suggests controlling the diacid/diamine ratio in a process for the manufacture of a polyamide by spectroscopic methods. In a preferred embodiment, the diacid/diamine ratio is determined by a Near InfraRed spectrometric analysis.

U.S. Pat. No. 5,213,668 discloses a method and apparatus for the monitoring and control of the concentration of ions, especially hydrogen ions (dosing hydrogen ion is equivalent to pH measurement), in process streams at elevated temperatures, for example in processes for the manufacture of polyamides.

The present inventors have found that the accurate metering of diacid and diamine during the process steps can be difficult. The reaction between the amine and the carboxylic acid functions generates heat leading to the problem of running the process at temperature close to the boiling point of the solution. Furthermore, from a productivity point of view the reaction has to be conducted in a large volume under high concentration of organic content (diacid and diamine) in order to limit quantity of water to be evaporated in the further steps of the process. In addition, this organic content can comprise a molar excess of the diacid.

This makes more difficult an accurate measurement of the diacid/diamine molar ratio by the known techniques, such as pH value measurement or Near InfraRed spectrometric analysis.

In particular it is well known that potentiometric methods, such as pH measurement, are impacted by the high operating temperature and high organic content of the salt solution (cf. FIG. 2 attached).

Furthermore, in order to avoid a large amount of water which at a further stage of the process has to be evaporated off, it is advantageous to feed the acid in powder form or in the form of an aqueous suspension. However, the presence of solid diacid particles also adversely affects the accuracy of the measurement of the diacid/diamine ratio by the known analysis methods. In particular, the solid content can modify the signal read using spectrometric methods, such as Near InfraRed, due to particle size and orientation.

One of the objects of the present invention is to provide a process for preparing a solution of nylon salt, wherein the diacid/diamine molar ratio in the solution can be easily and accurately measured all along the process steps, in particular when one of the monomers is added in molar excess to the other, particularly in the form of a powder or suspension, and/or when the process is conducted at high temperature.

The present inventors have found that this problem can surprisingly be solved by measuring the sound velocity in the reaction mixture and/or the density of the reaction mixture, and using the result of these measurements for adjustment of the mass balance of diacid and diamine added in the first reaction zone.

The present invention therefore relates to a process for the production of an aqueous solution of a salt of a diamine and a diacid, comprising the step of feeding into a first reaction zone a feed stream comprising the diamine, a feed stream comprising the diacid and optionally further feed streams, the flow rates of the feed streams being adjusted so that the diacid/diamine molar ratio in an output stream leaving the first reaction zone is greater than 1.1, characterized in that the first reaction zone contains an aqueous medium and in that the flow rates of the feed streams are adjusted in response to a change in sound velocity in the aqueous medium and/or density of the aqueous medium in the first reaction zone.

Here and in the following process steps "adjusting the flow rates of the feed streams" is to be understood as an adjustment of the mass or volumetric flow of at least one of the feed streams. Thus, the flow rate of one of the feed streams can be adjusted while the other(s) is/are kept constant. It can, for example, be advantageous, that the flow rate of the diamine feed stream is adjusted depending on the feed of the diacid, in particular if this diacid feed is constant, more preferably if the diacid is fed in powder form, for example, through mechanical conveyor.

Here and in the following process steps "reaction zone" is to be understood as for example a tank reactor, such as a reactor comprising mechanical agitation, but also including any other additional equipment, such as side stream pipes, mechanical conveyor, vessels, filter, recirculation line and/or sampling line using centrifugal pumps, static mixers or specific mixing device and any combinations thereof. It also may be equipped with means for heating or cooling the tank reactor when it is not running or during periods when the manufacturing program is being changed.

Each reaction zone also may be equipped with means for heating or cooling system streams to adjust thermal balance of each reaction zone, such as condenser in the second reaction zone to condense steam generated by the boiling of the salt solution.

The process of the invention can be carried out in batch-mode embodiment or a continuous-mode embodiment. Operation in continuous-mode embodiment is preferred.

The process of the present invention is carried out in reaction zones. Preferably, each reaction zone is contained in a separate reactor, namely the first reaction zone is contained in the first reactor; the second reaction zone is contained in the second reactor, etc. As a consequence the process of the invention is preferably carried out in an installation comprising several reactors arranged in series, each reactor corresponding to the performing of one step of the process.

In one embodiment one or more reaction zones can include several reactors each, working in parallel.

However, without departing from the context of the invention, the various steps of the process may be carried out successively in the same reactor. Similarly, the installation may comprise several reactors arranged in parallel, to carry out one step of the process.

Preferably, the process yields a fairly concentrated solution of nylon salt. Therefore, the flow rates of the feed streams are preferably adjusted so that the concentration of the dissolved reactants in the stream leaving the first reaction zone ranges from 40% to 70% by weight, preferably from 55% to 65% by weight based on the total weight of the stream leaving the first reaction zone.

The term "dissolved reactants" is to be understood to mean all the diacid and diamine species present in the medium in unreacted form or as resulting species of the neutralization reaction of diacid and diamine to form a salt. Moreover, "dissolved reactants" may additionally mean that all the diacid and diamine species are soluble in the medium and lead to homogeneous aqueous solution under operating conditions of temperature and pressure.

Here and in the following process steps "feed streams" is to be understood as streams of diacid or diamine reactants which are taking part in the reaction to produce an aqueous solution of nylon salt. Additionally, it can also refer to medium or solvent used to dissolve the reactants, such as demineralized water or any other, and to third party products needed for the polymerization.

As diacids suitable for the invention mention may be made of aliphatic dicarboxylic acids or aromatic dicarboxylic acids and any mixture thereof. The aliphatic dicarboxylic acids are preferred.

The aliphatic dicarboxylic acid may be linear, branched, cycloaliphatic or heterocycloaliphatic. The aliphatic dicarboxylic acid may for example have 4-18 carbon atoms, for example 6, 8, 10 or 12 carbon atoms such as 1,6-hexanedioic acid also known as adipic acid, 1,8-octanedioic acid, 1,10-decanedioic acid or 1,12-dodecanedioic acid.

The aromatic dicarboxylic acid can for example be isophthalic acid, terephthalic acid or naphthalene dicarboxylic acid.

Adipic acid (AA) is the preferred diacid.

The diacid may be used in powder form, or in the form of aqueous solution, or in the form of a suspension, wherein the solid content is preferably chosen in the range of contents above 0% and up to 45%, in particular up to 50% by weight based on the total weight of the suspension. Its use in powder form or in the form of an aqueous suspension is preferred. Its use in powdered form is particularly preferred. The stream comprising the diacid may contain other compounds and/or solvents.

The term "suspension" is to be understood as an aqueous solution saturated or nearly saturated in diacid and containing an excess of diacid in solid form under operating conditions.

As diamines that are suitable for the invention mention may be made of aliphatic diamines.

The aliphatic diamines may be linear, branched, cycloaliphatic or heterocycloaliphatic. They may include aromatic ring(s) in their structure. The aliphatic diamines may for example have 2-18 carbon atoms. More preferably the aliphatic diamines may have 2-12 carbon atoms per molecule, for example 6, 8, 10 or 12 carbon atoms such as 1,6-hexanediamine, 1,8-octanediamine, 1,10-decanediamine, 1,12-dodecanediamine, or derivatives thereof, such as 2-methyl-1,5-pentanediamine, 2-methyl-1,6-hexanediamine, 2-methyl-1,8-octanediamine or 2,5-dimethylhexanediamine. Examples of aliphatic diamine including an aromatic ring are m-xylylenediamine or p-xylylenediamine.

Hexamethylenediamine (HMD) is the preferred diamine.

In the process of the invention, the diamine is fed in pure form, or in the form of an aqueous solution. Such aqueous solution may comprise at least 10% by weight, preferably at least 50% by weight and more preferably at least 90% by weight of diamine based on the total weight of the aqueous solution.

As well as for the stream comprising the diacid, the stream comprising the diamine may contain other compounds and/or solvents.

The flow rates of the streams fed into the first reaction zone may be controlled in order to obtain in the first reaction zone an aqueous solution of unbalanced salt of diamines and diacids, containing a molar excess of diacid and called unbalanced aqueous solution. Preferably diacid and diamine monomers are added so as to reach an expected final concentration of nylon salt in water ranging from 50% to 70% by weight, preferably from 55% to 70% by weight, even more preferably from 60% to 65% by weight, after completion of the neutralization reaction in the further steps of the process.

The temperature of such streams fed into the first reaction zone may be controlled to obtain a homogeneous solution of unbalanced salt of diamines and diacids, which leads to run the process at a temperature higher than 50° C. but lower than the boiling point of the solution. Preferably the temperature in the first reaction step is maintained at a temperature high enough to reach the boiling point of the solution in the further reacting step, using heat provided by the neutralization reaction.

In this context "controlled" is understood as controlling the flow rates, concentrations and/or temperatures of the streams fed into the first reaction zone. For example the feed stream comprising the diamine can be heated or cooled to balance the heat supplied to the first reaction zone.

In one embodiment, the diacid is fed into the first reaction zone simultaneously with the feeding of the diamine and/or water. In another embodiment, the diacid is fed into the first reaction zone which already contains water and/or diamine. Additional diamine and/or water may then be added simultaneously with the diacid.

The streams fed into the first reaction zone may be distinct. In this case the diamine is preferably fed into the first reaction zone a in pure form, or in the form of a concentrated aqueous solution. Such aqueous solution may comprise at least 50% by weight, preferably at least 80% by weight and more preferably at least 90% by weight of diamine based on the total weight of the aqueous solution."

In another preferred embodiment, the diamine may be added together with the water, such as in the form of an aqueous solution. In this case, the concentration of the diamine in the aqueous solution can for example range from 10% to 50% by weight, preferably from 20% to 40% by weight, and more preferably from 25% to 35% by weight, each based on the total weight of the aqueous solution feed stream. In this embodiment, the diamine concentration in the feed stream containing water and the diamine can be controlled by measuring the conductivity of this feed stream.

Similarly, the diacid can be fed in powder form or in suspension form, for example, in water containing also dissolved diacid or a dissolved diacid/diamine mixture. The solid content of such suspension is preferably chosen in the range of contents above 0% and up to 50% by weight based on the total weight of the suspension. Its use in powder form is particularly preferred.

The flow rates of the feed streams being fed into the first reaction zone are adjusted so that the diacid/diamine molar ratio in the stream leaving the first reaction zone is greater than 1.1, preferably greater than 1.5 and even more preferably greater than 2, such as between 2 and 5, more preferably between 2 and 3. The amount of diacid fed into the first reaction zone preferably corresponds to at least 90% of the total quantity of diacid required to produce the desired amount of aqueous salt solution. The amount of water supplied to the first reaction zone is preferably at least 80% of the total quantity of water required to produce the desired amount of aqueous salt solution. For example the concentration of dissolved reactants in the stream leaving the first reaction zone ranges from 40% to 70% by weight, preferably from 55% to 65% by weight based on the total weight of the stream leaving the first reaction zone.

The adjustment of the flow rates is conducted in response to a change in sound velocity and/or density of the medium in the first reaction zone. It has been found that the measurement of sound velocity in the reaction medium and/or density of the reaction medium in the first reaction zone allows an easy adjustment of the flow rates of the feed streams, preferably the feed stream comprising the diamine and/or water, to obtain the desired diacid/diamine molar ratio with an accuracy in the order of 1E-2. More precisely accuracy of ±0.05 or better using density measurement and about ±0.03 or better using sound velocity measurement can be attained.

The response of sound velocity and/or density measurements is even more accurate if these measurements are carried out in the homogeneous solution taking into account all reactants contained in the first reaction zone. However it has been found that the measurement of sound velocity and/or density may also be done during time needed for completion of the dissolution of all the reactants in the first reaction zone.

The flow rates fed into the first reaction zone are adjusted in response to a change in sound velocity and/or density in the first reaction zone. Both density and sound velocity depend for example on the concentration of dissolved reactants in the aqueous solution. For example an increase in free diacid results in an increase of density and a decrease of sound velocity, as illustrated in FIGS. 3 and 4 using adipic acid as example for the diacid.

Both density and sound velocity measurements should be conducted at constant temperature or, if the temperature varies over time, the resulting change in density or sound velocity must be considered in the adjustment of the flow rates of the streams fed into the first reaction zone. This is illustrated in FIGS. 3 and 4 for density and sound velocity, respectively, at temperatures 65° C. and 70° C.

The knowledge of the concentrations of dissolved reactants via density and/or sound velocity measurements gives access to a highly efficient monitoring of the flow rates of the feed streams, with preferred action on liquid feed streams. Two strategies can be applied to complete mass balance in the first reaction zone and attain desired molar ratio:

Control the flow of one feed stream, preferably diamine feed stream, and keep the other flow constant. In this case one physical property measurement is sufficient to determine individual concentrations in the aqueous solution. The adjustment of diacid/diamine molar ratio is conducted in response to a change in sound velocity or density in the first reaction zone.

Control the flow of two feed streams in parallel, preferably diamine and water feed stream, while keeping the diacid feed stream constant. In this case a second physical property measurement is required to determine individual concentrations in the aqueous solution. The adjustment of diacid/diamine molar ratio is conducted in response to a change in sound velocity and in density in the first reaction zone.

Sound velocity and/or density are measured in the first reaction zone. The measurement can take place either directly within for example a stirred reaction tank, or by taking a sample as representative as possible of the aqueous solution within the first reaction zone. For example, such sample can be a part of the flow in a recirculation loop of the reactor, this secondary flow being controlled using a mass flow meter (maximum flow for example 1000 L/h, preferably less than 500 L/h). The sample thus obtained of the aqueous solution can be fed to a filtration device to eliminate solid particles without impact on the solved species content, to a degassing device to avoid bubbles, and to a heat exchanger to obtain a flow at constant temperature before conducting the sound velocity and/or density measurement(s).

Sound velocity and density in the first reaction zone can be measured using devices known to the skilled person, such as equipment being commercially available. For example, sound velocity can be measured with a sound velocity probe using an acoustic transducer and a reflecting surface, mounted at a known distance from the acoustic center of the transducer. The time required from the transmit to the receipt of a pulse can be measured. From this time, the speed of sound can be calculated. Transducers used in sound velocity probes typically operate at a high frequency (around 1-4 MHz) as the transmit and receipt distances are close enough to mitigate any significant absorption losses.

The density of a material is defined as its mass divided by the volume. The density measurement can be based on the measurement of the period of oscillation of a mechanical oscillator operated at its natural frequency. The mechanical oscillator may consist of a U-shaped tube, containing the sample, which is flowing continuously. The period of oscillation depends on the density of the sample within the mechanical oscillator and the mechanical properties of the oscillator like inner diameter, wall thickness, elasticity, etc. of the tube. Both density of the sample and mechanical properties of the tube depend on temperature. Therefore, also the temperature is measured, this information being also needed for determination of the density.

The sound velocity "sv" is defined as the distance "d" travelled by a sound pulse, divided by the corresponding propagation time "t".

Ultrasonic pulses are generated using a piezo-electric transmitter. The pulses are going from the transmitter through the sample to the receiver. The sample flows between the transmitter and the receiver. The propagation time of the ultrasonic pulse is measured, and converted into a periodic signal. Both the sound velocity of the sample and the mechanical properties of the transducer depend on temperature. Therefore, also the temperature is measured and used for the calculation of sound velocity.

For example, in the process of the present invention a density and sound velocity transducer, such as DSRn (for example DSRn427) or DPRn, from the company Anton Paar GmbH, Austria, may be used. Details about transducer and measurement are provided in the Instruction Manual available from the manufacturer.

In a preferred embodiment, the diamine is fed into the first reaction zone in the form of an aqueous solution. This aqueous solution can be ready for use at a set concentration and the diacid/diamine molar ratio obtained in the first reaction zone is monitored via adjustment of the flow rate of the diamine feed stream in response to a change in sound velocity or density, while the diacid is fed in powder form at a constant rate. In another embodiment, it is, however, also possible to dissolve the pure diamine in water or dilute a more concentrated aqueous diamine solution in water to obtain the feed stream comprising diamine, thereby adjusting the concentration of the diamine in the feed stream in response to a change in sound velocity and density in the first reaction zone. Thus, the diacid/diamine molar ratio obtained in the first reaction zone cannot only be monitored by adjusting the flow rate of the diamine feed stream but additionally by adjusting the concentration of the diamine in its feed stream.

The aqueous solution obtained in the first reaction zone may be transferred into a second reaction zone where a stream comprising diamine and optionally a stream comprising water is introduced to build a diacid/diamine molar ratio in the stream leaving the second reaction zone ranging from 0.900 to 1.100, preferably from 0.950 to 1.050, even more preferably from 1.000 to 1.010. It is preferred to stay in molar excess of diacid compound before final adjustment of aqueous salt solution.

Preferably, the flow rates of the streams fed into the second reaction zone are adjusted so that the concentration of the dissolved reactants in the stream leaving the second reaction zone ranges from 50% to 70% by weight, preferably from 55% to 70% by weight, even more preferably from 60% to 65% by weight, such as about 65% by weight.

The flow rates of the streams fed into the second reaction zone can for example be adjusted in response to a change in pH of the solution in the second reaction zone. Adjustment of the molar ratio via a pH value measurement is described in US 2014/0249330 A1 and WO 2014/179067.

Accuracy of pH measurement is impacted by temperature and concentration of the organic species contained in the aqueous solution. To achieve the desired accuracy in the second and third reaction zone, the solution is diluted and cooled down before pH measurement.

The dilution method is applied to a part of the flow in recirculation through the reactor, controlling this flow with a mass flow meter (maximum flow 1000 L/h, preferably less than 500 L/h). The nylon salt solution may flow through a mixing element such as a three-way valve where a side flow of water is injected to achieve dilution of the nylon salt. The dilution rate can be adjusted following the outlet temperature of the solution or the ratio of inlet flows through the mixing element. The mixing element where the dilution occurs advantageously has a specific design to provide efficient mixing of the salt solution with water, in a short time (for example, vortex effect to drive salt in a turbulent way at the outlet of valve). Finally the diluted salt solution can be cooled down within a heat exchanger before pH measurement. Using this system both dilution rate and temperature of the solution flowing through pH probe can be controlled, allowing high accuracy pH measurement in accordance with the range of molar ratio needed. Dilution rate may be done to analyze a solution at a concentration between 50% and 10% by weight within a range of temperature from 100° C. to 20° C., preferably 50% by weight at 40° C., more preferably 20% by weight at 30° C., and even more preferably 10% by weight at 20 or 25° C.

In the second reaction zone, the diacid/diamine molar ratio can be adjusted with an accuracy in the order of 1E-3.

In a further embodiment of the process of the present invention the aqueous solution obtained in the second reaction zone is transferred to a third reaction zone where a stream comprising diamine and/or a stream comprising diacid and optionally a stream comprising water is introduced to build a diacid/diamine molar ratio in the output stream leaving the third reaction zone chosen between 0.995 and 1.005, preferably between 0.9997 and 1.0003.

The flow rates of the streams fed into the third reaction zone may be adjusted so that the concentration of dissolved reactants in the stream leaving the third reaction zone ranges from 50% to 70% by weight, preferably from 55% to 70% by weight, even more preferably from 60% to 65% by weight, such as about 65% by weight, based on the total weight of the stream leaving the third reaction zone.

In a preferred embodiment of the present invention, the flow rates of the streams fed into the third reaction zone are adjusted in response to a change in pH and optionally refractive index of the solution in the third reaction zone. This adjustment allows for an accuracy of the diacid/diamine molar ratio equal to +/−0.0003 or better, and an accuracy of the concentration of the solution equal to +/−0.2% in mass or better.

The refractive index can be measured directly within the solution or in a diluted stream. pH measurement is most preferably done on a diluted stream.

The concentrated salt solution obtained according to the process of the invention may be fed directly and continuously into a polymerization installation, or may be stored before transfer and use.

BRIEF DESCRIPTION OF DRAWINGS

A detailed description of two embodiments of the process of the invention is given below with reference to the attached FIGS. 1 to 5 in which:

FIG. 2 shows the sensitivity of pH measurement in function of concentration and temperature of the nylon salt solution. Each point in the curve corresponds to the maximal slope read on the curve pH vs MR (MR:molar ratio) under the conditions set out above. This slope is understood as the value of $\Delta pH/\Delta MR$ read at molar equivalence (molar ratio=1). The pH value is read on pH meter lab using glass and silver/silver chloride electrodes. According to the figure, pH sensitivity is higher when the measurement is done on a solution at lower concentration and lower temperature. For example slope read on pH of 15% in weight nylon salt solution at 20° C. indicates that pH measurement is seven times more sensitive than that done on a 45% solution at 70° C.

Figure 3:
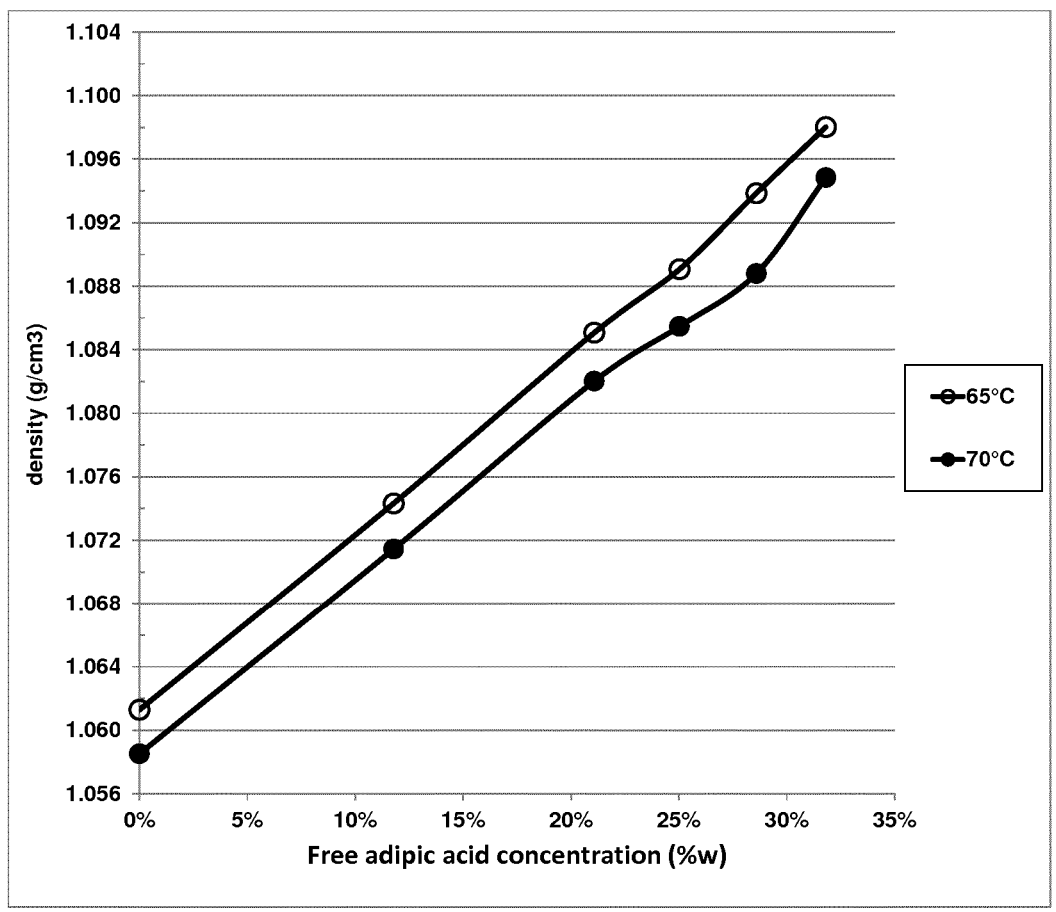
FIG. 3 shows the relationship between density and concentration of adipic acid in free form in aqueous solution, at two different temperatures.
Figure 4:
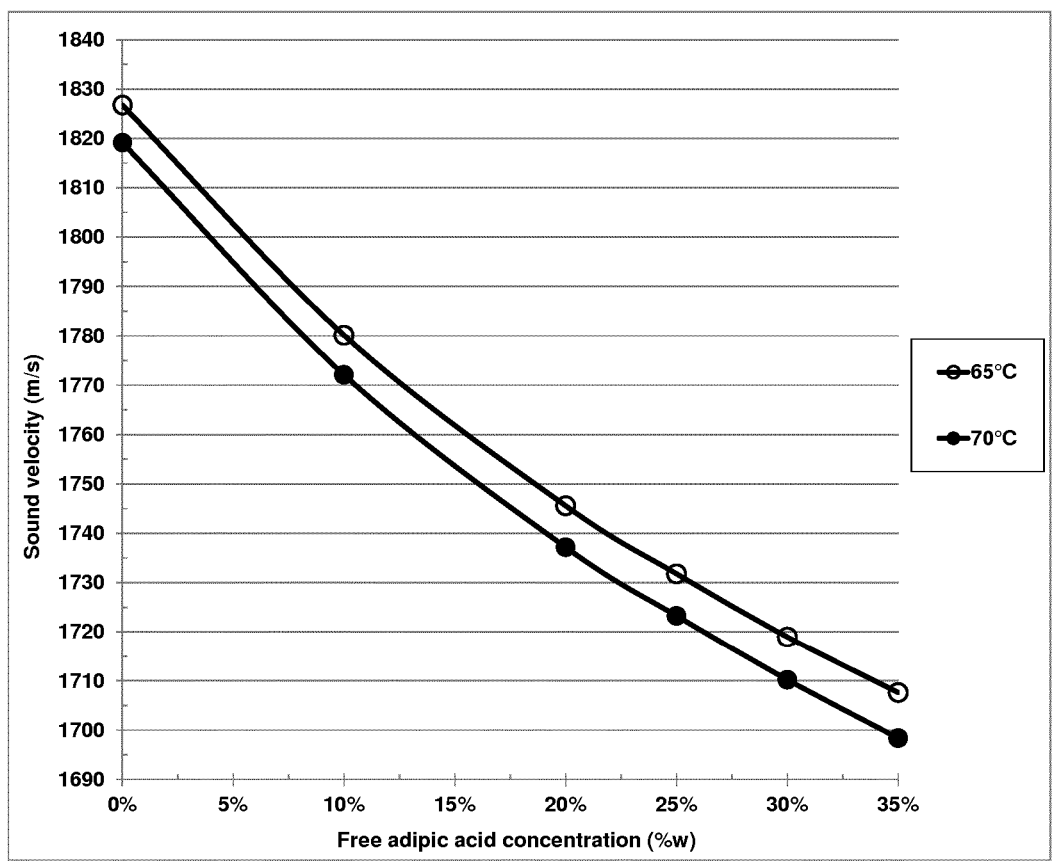
FIG. 4 shows the relationship between sound velocity and concentration of adipic acid in free form in aqueous solution, at two different temperatures.

The FIGS. 3 and 4 show development of density and sound velocity measurements as functions of the concentration of diacid and temperature of the solution. Here "free adipic acid" is to be understood as the quantity of adipic acid dissolved in the solution but not chemically reacted with the diamine. In other words, it corresponds to the adipic acid quantity in excess vs stoichiometric quantity corresponding to exact neutralization reaction with the diamine. Each point on the curve is related to the value of density or sound velocity obtained on an aqueous mixture of nylon salt and adipic acid of known composition. The range of free adipic acid concentration is obtained by progressively adding adipic acid powder to the starting solution composed of nylon salt at a concentration of 42% in weight. The value is read using two devices, one U-shape mechanical oscillator to measure density, and one piezo-electric transmitter for sound velocity, both from supplier Proanatec, France.

Figure 5:
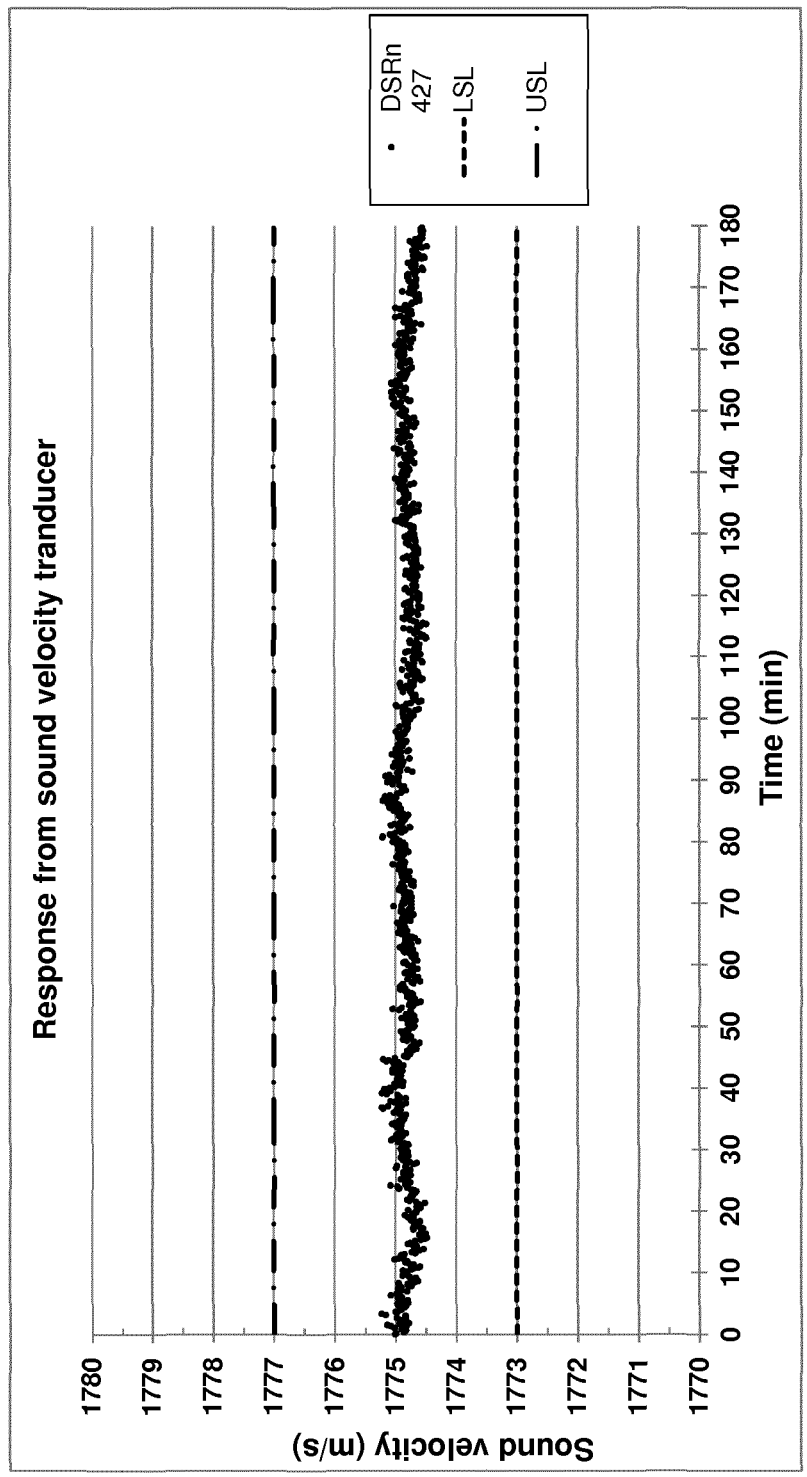
FIG. 5 shows the variability of sound velocity measurement as a function of time.

FIG. 5 shows the variability of sound velocity measurement as function of time. Each point in the curve corresponds to a measurement of the return signal from DSRn 427 transducer with a frequency of 10 seconds over a 3 hour period. The two straight lines read in the graph referred to upper and lower specification regarding diacid/diamine molar ratio process control. Capability of the sound velocity measurement is given by comparison of the width of the specification with the short-term width of the process: $Cp=(USL-LSL)/(6*\sigma sv)$. In that case capability is higher than 1.7, meaning that process control is effective according to required specification.

The invention is also illustrated by the examples of the manufacture of concentrated solutions of nylon salt obtained according to the continuous-mode embodiment of the process.

In the description below, the terms adipic acid (AA) and hexamethylenediamine (HMD) will be used to denote the diacid and the diamine. However, this process also applies to the other diacids and other diamines indicated above.

Figure 1:
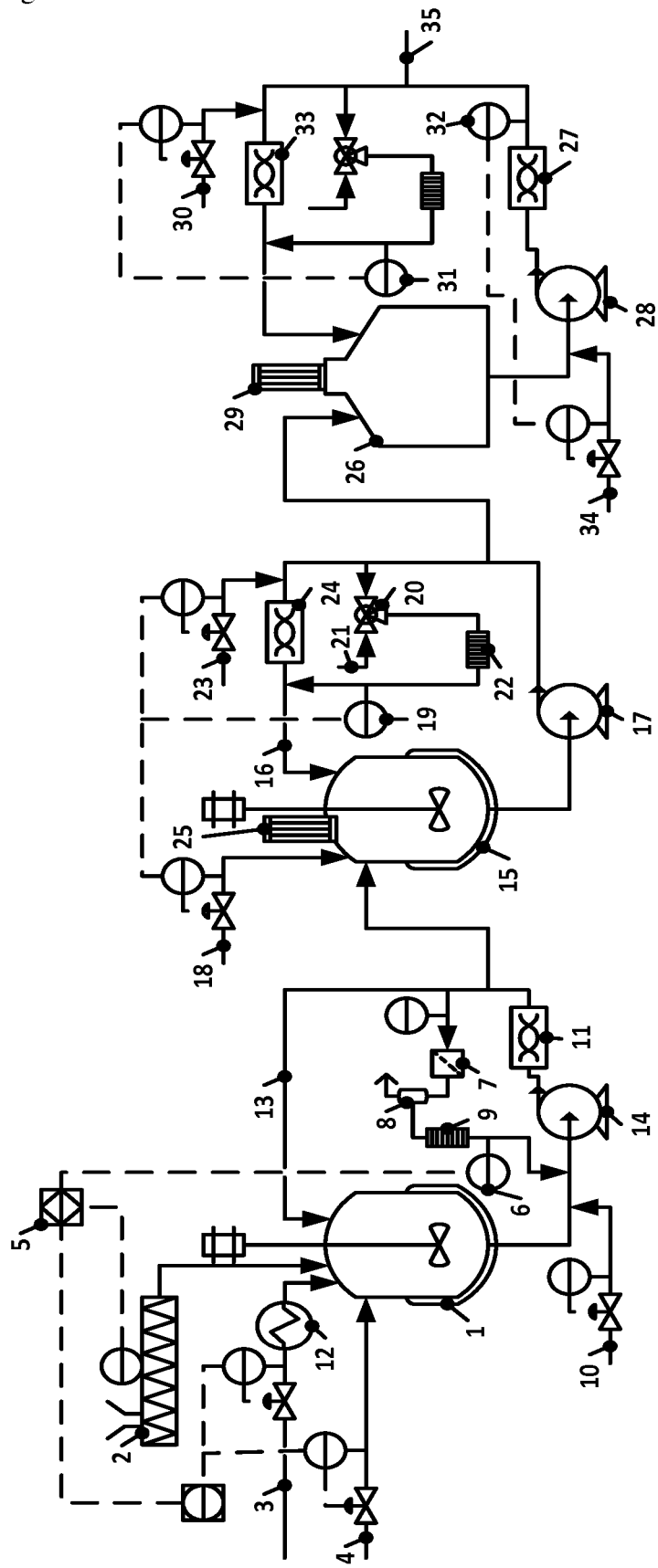
FIG. 1 represents a synoptic scheme of an installation for carrying out the process according to a continuous-mode embodiment.

With reference to FIG. 1, this figure describes one embodiment of the process of the invention operated according to the continuous mode. The installation comprises a first stirred reactor 1, in which adipic acid is fed generally in form of solid powder by means of an endless screw system 2, and in which liquid stream 3 of hexamethylenediamine and stream 4 of demineralized water or third party product are added simultaneously. The hexamethylenediamine is advantageously an aqueous solution comprising between 15% and 90% by weight of HMD, for example equal to 23% so as to obtain in reactor 1 a solution containing a diacid/diamine molar ratio between 1.5 and 5, preferably in the region of 2.4, and a concentration by weight of dissolved species between 40% and 70%, for example equal to 55%.

The molar ratio is advantageously controlled and adjusted by means of programmable logic controller 5 which is outputting mass balance in function of the response of device 6 measuring the sound velocity and/or density of the solution, and inlet mass flow of the streams 2, 3 and 4. To work in optimal conditions for sound velocity and/or density measurements, a part of the aqueous medium in circulation is diverted to sampling line equipped with filtration 7, degassing 8 and heat exchanger 9, before conducting the measurement(s). Change in sound velocity and/or density in the first reaction zone acts on the flow rate of one feed stream, preferably diamine feed stream 3, keeping the other ones constant. In another embodiment, part of the diamine is fed into the reactor 1 by means of a stream that is independent of the main stream 3, thus making possible to accurately control molar ratio into the reactor 1 by means of the hexamethylenediamine stream 10 fed in circulation loop upstream of static mixer 11, or alternatively by means of the addition of these two streams 3 and 10. The temperature in reactor 1 is maintained above freezing point of the solution using heat from the neutralization reaction between diacid and diamine, and a small amount of heat advantageously added via the adjustment of the temperature of diamine and/or demineralized water streams at outlet of heat exchanger 12. However, the temperature of the solution in reactor 1, throughout the process and at the end of the step, will always be as low as possible, preferably below the boiling point of the solution at the operating pressure, and more generally below 80° C. This low temperature level combined with acidic excess in the solution is advantageous for limiting oxidation of HMD by oxygen present in the medium. Oxygen may in particular come from interstitial or adsorbed air in the adipic acid powder feed.

The aqueous medium is advantageously recirculated in an external circulation loop 13 comprising a pump 14. A part of the product circulating in the loop feeds a second stirred reactor 15 also called neutralization reactor, equipped with an external neutralization loop 16 comprising a pump 17 as illustrated. Most part of the hexamethylenediamine is fed into this second reactor 15 via line 18, in order to obtain an AA/HMD molar ratio in the region of 1.01, preferably in the region of 1.005, and a concentration by weight of dissolved salt between 50% and 70%, preferably between 55% and 70%, even more preferably between 60% and 70%, for example close to 65%. It is preferable to stay in excess of diacid compound, and to make final fine tuning adjustment of salt molar balance using advantageously a liquid stream of hexamethylenediamine. The molar ratio is controlled and adjusted by means of the device 19 used for measuring the pH of the solution. To work in optimal conditions for pH measurement, a part of the aqueous salt solution in circulation can be diverted to a sampling line equipped with specific apparatus 20 to mix the salt from sample line with a side flow of water 21, and a heat exchanger 22, before conducting the pH measurement. Change in pH value in the second reaction zone acts on the flow rate of hexamethylenediamine stream feed 18. In another embodiment, a part of the diamine is fed into the reactor 15 by means of a stream 23 that is independent of the main stream 18, thus making possible to accurately control molar ratio into the reactor 15 by means of the stream 23 fed in recirculation loop upstream of static mixer 24, or alternatively by means of the addition of the two streams 18 and 23. As in the first reaction step, advantageously no significant heat is exchanged with the exterior, the heat given off by the neutralization allowing the temperature of the solution to increase, until at most the boiling point of the solution under operating pressure is reached. In order to condense the water thus evaporated off, a condenser 25 is arranged at the top of reactor 15 to obtain total reflux of the water. The heat quantity exchanged in this condenser is very low and results from little excess of heat vs global heat balance, brought with preheated hexamethylenediamine and/or demineralized water streams at the first reaction step. According to a preferred embodiment, most part of the heat given off by the neutralization reaction is used to heat the aqueous salt solution and maintain the temperature above its freezing point. More particularly, reaching the boiling point is advantageous as it makes possible to eliminate, by steam distillation, the oxygen present in the medium, in particular oxygen present under dissolved form.

In the embodiment illustrated, which is the preferred embodiment of the invention, the solution obtained in the second reactor 15 is fed into a third reactor or tank 26 equipped with a stirring device, for example a jet nozzle fitted at the return point of an external circulation loop (not shown on FIG. 1, with a pump 28 and advantageously a condenser 29.

The working principle of third reactor 26, also called adjustment reactor, is similar to that of second reactor, and comprises an addition 30 of HMD in order to accurately adjust the AA/HMD ratio to a value ranging from 0.995 to 1.005, preferably from 0.9997 to 1.0003. The molar ratio is controlled and adjusted by means of the device 31 used for measuring the pH of the solution, and using same working principle and equipment than at previous step for sampling part of the salt solution and pH measurement under optimal conditions of concentration and temperature. A change in pH in the third reaction zone acts on the flow rate of hexamethylenediamine stream feed 30. Water can also be added in order to adjust the concentration of hexamethylenediammonium adipate salt to a concentration by weight of greater than 50%, preferably between 55% and 70%, more preferably between 60% and 70%, for example 65%. The concentration of the salt solution is controlled and adjusted by means of the device 32 used to measure the refractive index of the salt solution. A change in the refractive index value in the third reaction zone acts on the flow rate of demineralized water stream feed 34. This water flow may also advantageously be mixed with the stream of hexamethylenediamine 30 connected to recirculation loop upstream of static mixer 33.

The solution thus obtained 35 can be used directly in a polymerization installation or can be stored in a storage or buffer tank or in containers suitable for transport.

According to a preferred embodiment, the reactors of the installation are maintained under an oxygen-free atmosphere by feeding an inert gas such as nitrogen so as to maintain and renew the inert reactor atmosphere during operation of the reactors. The nitrogen feeds for each reactor are not represented on FIG. 1. In this embodiment, the dissolved oxygen will be evacuated, being entrained with the nitrogen which escapes from the reactor during steam distillation. This evacuation of nitrogen is preferably carried out through a condenser so as to thus condense the steam entrained by the nitrogen flow.

Advantageously, the reactors are equipped with thermal insulation in order to limit heat exchanges with the environment and thus to limit heat losses.

EXAMPLE 1

Production of an aqueous solution of Nylon Salt at 52% by weight by adjusting diacid/diamine molar ratio in response to a change in sound velocity in the first reaction zone and pH in second and third zones.

Reaction Zone 1—Dissolution of Adipic Acid

An aqueous solution of adipic acid and hexamethylene diamine is prepared by feeding continuously adipic acid powder via mechanical screw at constant feed rate (8000 kg/h) in a stirred vessel. HMD solution at concentration 33.6% w is added simultaneously, taking care that there is always an excess of diacid in the mixture so as the molar ratio diacid/diamine is maintained at 2.0 in the first reaction zone. Feed rate variability of adipic acid via mechanical screw is about +/−5% of the feeding flow rate, which corresponds to a variation of molar ratio of about +/−0.1. The feed rate of 33.6% w HMD (about 9466 kg/h) is adjusted in response to a change in sound velocity (1775 m/s+/−2 m/s) using a DSRn427 transducer and a control valve connected to a Coriolis mass flow meter. The sound velocity is measured on an auxiliary loop operated at a low flow rate (250 kg/h) with filtration and degassing systems. Capability of the sound velocity measurement based on the short term standard deviation ($6 \times \sigma_{sv}$=+/−0.9 m/s, sensor accuracy 0.1 m/s) makes possible to control adipic acid concentration in the aqueous solution with an accuracy of +/−0.3% w according to FIG. 5. Therefore diacid/diamine molar ratio can be adjusted with an accuracy of +/−0.02.

The concentration of the HMD solution is controlled prior to the feed in reaction zone 1, by measuring conductivity of the HMD solution. The concentration of HMD solution is set to 33.6% w in order to reach a final N-salt concentration of 52% w in the solution after complete neutralization. The 33.6% w HMD feed temperature is adjusted (40° C.), using a plate heat exchanger to keep a temperature of 65° C. in the reaction zone 1 vessel.

Reaction 2—Neutralization

Figure 2:
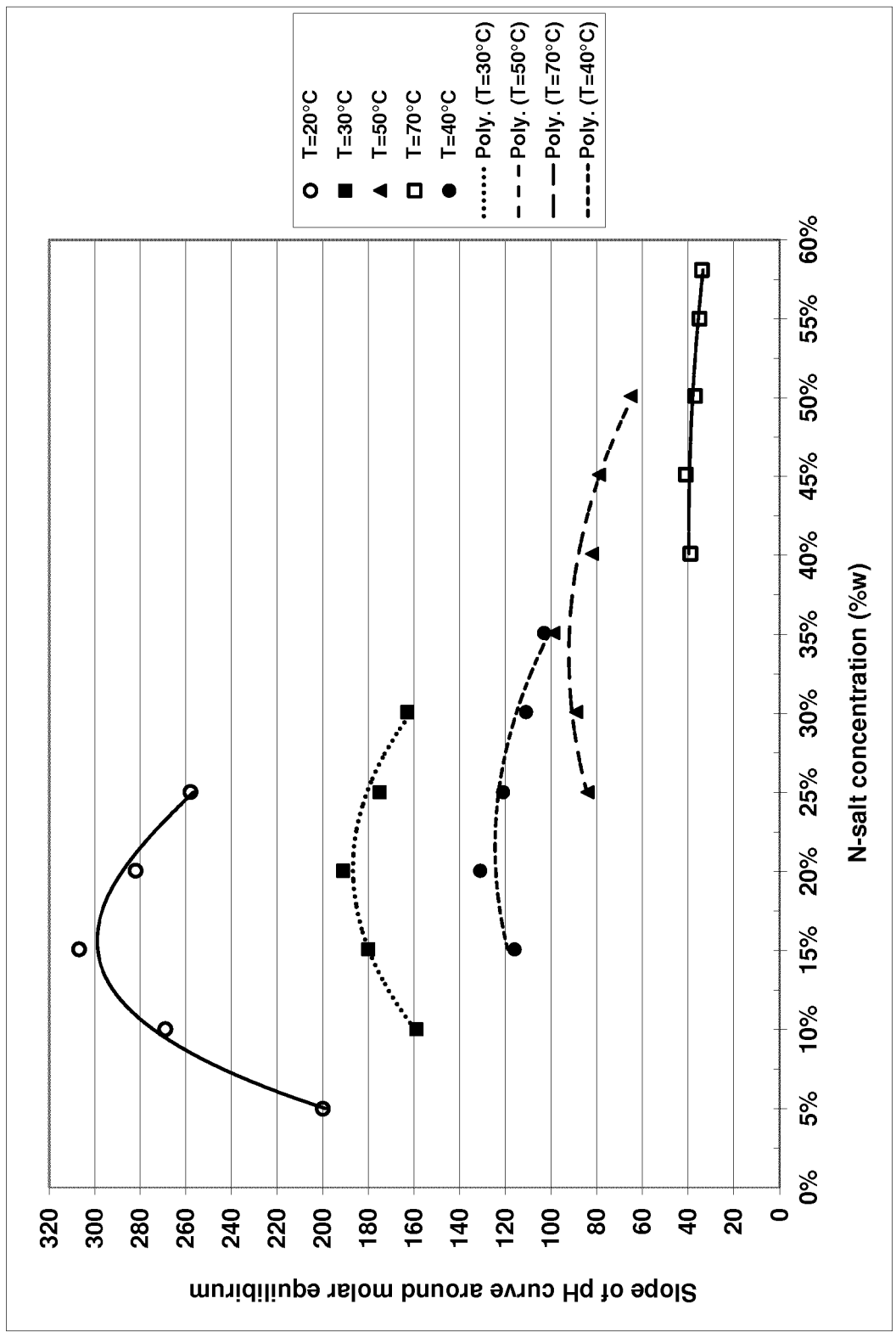
FIG. 2 shows the relationship between pH value measurement sensitivity and concentration of dissolved species in aqueous solution at different temperatures.

The aqueous solution obtained in the reaction zone 1 is transferred to a second vessel wherein neutralization of unreacted adipic acid is completed by adding continuously 33.6% w HMD. The feed rate of 33.6% w HMD (about 9372 kg/h) is adjusted in response to a change in pH (7.45+/−0.05 pH unit) using a control valve connected to a Coriolis mass flow meter. The pH is measured on an auxiliary loop operated at a low flow rate with a dilution system. The dilution is done by mixing cold demineralized water with 53% N-salt via a three-way control valve. The flow rates of N-salt (500 kg/h) and demineralized water (168 kg/h) are adjusted using a control valve connected to a Coriolis mass flow meter so as to reach a concentration of 40% w at the outlet of the dilution system. The diluted stream is then cooled down to 40° C. via a plate heat exchanger prior to pH measurement. Capability of the pH measurement based on the short term standard deviation ($6 \times \sigma_{sv}$=+/−0.15 pH unit) makes possible to control the molar ratio in the aqueous solution with an accuracy of +/−0.002 according to FIG. 2.

Reaction 3—Adjustment

In the same way the nylon salt solution obtained in the reaction zone 2 is transferred to a third vessel wherein diacid/diamine molar ratio is adjusted by metering continuously 33.6% w HMD. The feed rate of 33.6% w HMD (about 89 kg/h) is adjusted in response to a change in pH (7.85+/−0.05 pH unit) using a control valve connected to a Coriolis mass flow meter. The pH is measured on an auxiliary loop operated at a low flow rate with a dilution system. The dilution is done by mixing cold demineralized water with 52% N-salt via a three-way control valve. The flow rates of N-salt (125 kg/h) and demineralized water (538 kg/h) are adjusted using a control valve connected to a Coriolis mass flow meter so as to reach a concentration of 10% w at the outlet. The diluted stream is then cooled down to 20° C. through a plate heat exchanger prior to pH measurement. Capability of the pH measurement based on the short term standard deviation ($6\times\sigma_{sv}$=+/−0.02 pH unit) makes possible to control the molar ratio in the aqueous solution with an accuracy of +/−0.00008 according to FIG. 2.

EXAMPLE 2

Production of an aqueous solution of Nylon Salt at 62% by weight by adjusting diacid/diamine molar ratio in response to a change in density in the first reaction zone and pH in second and third zones.

Reaction Zone 1—Dissolution of Adipic Acid

An aqueous solution of adipic acid and hexamethylene diamine is prepared by feeding continuously adipic acid powder via a mechanical screw at constant feed rate (10000 kg/h) in a stirred vessel. HMD solution at concentration 24.8% w is added simultaneously, taking care that there is always an excess of diacid in the mixture so as the molar ratio diacid/diamine is maintained at 2.4 in the first reaction zone. Feed rate variability of adipic acid added via mechanical screw is about +/−5% of the feeding flow rate, which corresponds to a variation of molar ratio of about +/−0.1. The feed rate of 24.8% w HMD (about 13360 kg/h) is adjusted in response to a change in density (1108 kg/m3+/−1 kg/m3) using a DSRn427 transducer and a control valve connected to a Coriolis mass flow meter. The density is measured on auxiliary loop operated at a low flow rate (250 kg/h) with filtration and degassing systems. Capability of the density measurement based on the short term standard deviation ($6\times\sigma_{sv}$=+/−0.6 kg/m3, sensor accuracy from 0.1 to 0.05 kg/m3) makes possible to control adipic acid concentration in the aqueous solution with an accuracy of +/−0.5% w. Therefore diacid/diamine molar ratio can be adjusted with an accuracy of +/−0.04.

The concentration of the HMD solution is controlled prior to the feed in reaction zone 1, by measuring conductivity of the HMD solution. The concentration of the HMD solution is set to 24.8% w in order to reach a final N-salt concentration of 62% w in the solution after complete neutralization. The 24.8% w HMD feed temperature is adjusted (55° C.) using a plate heat exchanger so as to keep a temperature of 65° C. in the reaction zone 1 vessel.

Reaction 2—Neutralization

The aqueous solution obtained in the reaction zone 1 is transferred to a second vessel wherein neutralization of unreacted acid adipic is completed by continuous addition of pure HMD. The feed rate of pure HMD (about 4599 kg/h) is adjusted in response to a change in pH (7.45+/−0.05 pH unit) using a control valve connected to a Coriolis mass flow meter. The pH is measured on an auxiliary loop operated at a low flow rate with a dilution system. The dilution is done by mixing cold demineralized water with 64% w N-salt via a three-way control valve. The flow rates of N-salt (500 kg/h) and demineralized water (300 kg/h) are adjusted using a control valve connected to a Coriolis mass flow meter so as to reach a concentration of 40% w at the outlet. The diluted stream is then cooled down to 40° C. via a plate heat exchanger prior to pH measurement. Capability of the pH measurement based on the short term standard deviation ($6\times\sigma_{sv}$=+/−0.15 pH unit) makes possible to control molar ratio in the aqueous solution with an accuracy of +/−0.002 according to FIG. 2.

Reaction 3—Adjustment

In the same way the nylon salt solution obtained in the reaction zone 2 is transferred to a third vessel wherein diacid/diamine molar ratio is adjusted by continuously metering pure HMD. The feed rate of pure HMD (about 37 kg/h) is adjusted in response to a change in pH (7.85+/−0.05 pH unit) using a control valve connected to a Coriolis mass flow meter. The pH is measured on an auxiliary loop operated at a low flow rate with a dilution system. The dilution is done by mixing cold demineralized water with 63% w N-salt via a three-way control valve. The flow rates of N-salt (125 kg/h) and demineralized water (668 kg/h) are adjusted using a control valve connected to a Coriolis mass flow meter so as to reach a concentration of 10% w at the outlet. The diluted stream is then cooled down to 20° C. via a plate heat exchanger prior to pH measurement. Capability of the pH measurement based on the short term standard deviation ($6\times\sigma_{sv}$=+/−0.02 pH unit) makes possible to control the molar ratio in the aqueous solution with an accuracy of +/−0.00008 according to FIG. 2.

The invention claimed is:

1. A process for the production of an aqueous solution of a salt of a diamine and a diacid, comprising the step of feeding into a first reaction zone a feed stream comprising the diamine, a feed stream comprising the diacid and optionally further feed streams, the flow rates of the feed streams being adjusted so that the diacid/diamine molar ratio in an output stream leaving the first reaction zone is greater than 1.1, wherein the first reaction zone contains an aqueous medium and in that the flow rates of the feed streams are adjusted in response to a change in sound velocity and/or density of the aqueous medium in the first reaction zone.

2. The process according to claim 1, wherein the flow rates of the feed streams are adjusted so that the concentration of dissolved reactants in the stream leaving the first reaction zone ranges from 40% to 70% by weight.

3. The process according to claim 1, wherein the feed stream comprising the diacid contains solid diacid.

4. The process according to claim 1, wherein the diacid is fed into the first reaction zone simultaneously with the feed of the diamine and water or wherein the diacid is fed into the first reaction zone which already contains water and/or diamine.

5. The process according to claim 1, wherein the feed stream comprising the diamine contains an aqueous solution of the diamine at a concentration of 10% to 50% by weight.

6. The process according to claim 1, comprising the further step of dissolving the diamine in water or diluting an aqueous solution of the diamine with water to obtain the feed stream comprising the diamine, wherein the concentration of the diamine in the feed stream is adjusted in response to a change in sound velocity and/or density of the aqueous medium in the first reaction zone.

7. The process according to claim 1, comprising the further steps of transferring the aqueous solution obtained in the first reaction zone into a second reaction zone; and introducing into the second reaction zone a stream comprising diamine and optionally a stream comprising water so as to obtain a diacid/diamine molar ratio in an output stream leaving the second reaction zone ranging from 0.9 to 1.1.

8. The process according to claim 7, wherein the flow rates of the streams fed into the second reaction zone are adjusted so that the concentration of dissolved reactants in the output stream leaving the second reaction zone ranges from 50% to 70% by weight.

9. The process according to claim 7, wherein the flow rates of the streams comprising diamine fed into the second reaction zone are adjusted in response to a change in pH of the solution in the second reaction zone.

10. The process according to claim 1, comprising the further steps of transferring the aqueous solution obtained in the second reaction zone into a third reaction zone; and introducing into the third reaction zone a stream comprising diamine and/or a stream comprising diacid and/or a stream comprising water so as to obtain a diacid/diamine molar ratio in an output stream leaving the third reaction zone ranging from 0.995 to 1.005.

11. The process according to claim 10, wherein the flow rates of the streams fed into the third reaction zone are adjusted so that the concentration of dissolved reactants in the stream leaving the third reaction zone ranges from 50% to 70% by weight.

12. The process according to claim 10, wherein the flow rates of the streams fed into the third reaction zone are adjusted in response to a change in pH and/or refractive index of the solution in the third reaction zone.

13. The process according to claim 1, wherein the process is carried out continuously.

14. The process according to claim 1, wherein the diamine comprises hexamethylenediamine and the diacid comprises adipic acid.

15. The process of claim 1, further comprising manufacturing a polyamide from the aqueous solution of a salt of a diamine and a diacid.

* * * * *

UNITED STATES PATENT AND TRADEMARK OFFICE
CERTIFICATE OF CORRECTION

PATENT NO. : 10,975,199 B2  
APPLICATION NO. : 16/335898  
DATED : April 13, 2021  
INVENTOR(S) : Jean-François Thierry et al.

Page 1 of 1

It is certified that error appears in the above-identified patent and that said Letters Patent is hereby corrected as shown below:

On the Title Page

Item (73) Assignee, "PolyTeclmyl" should read -- PolyTechnyl --.

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*